United States Patent
Rao et al.

(10) Patent No.: US 10,372,289 B2
(45) Date of Patent: Aug. 6, 2019

(54) WRAPAROUND INTERFACE LAYOUT METHOD, CONTENT SWITCHING METHOD UNDER THREE-DIMENSIONAL IMMERSIVE ENVIRONMENT, AND LIST SWITCHING METHOD

(71) Applicant: BEIJING PICO TECHNOLOGY CO., LTD., Beijing (CN)

(72) Inventors: Xiaolin Rao, Beijing (CN); Xue Feng, Beijing (CN)

(73) Assignee: Beijing Pico Technology Co., Ltd., Beijing (CN)

( * ) Notice: Subject to any disclaimer, the term of this patent is extended or adjusted under 35 U.S.C. 154(b) by 261 days.

(21) Appl. No.: 15/117,348

(22) PCT Filed: Jul. 18, 2016

(86) PCT No.: PCT/CN2016/090295
§ 371 (c)(1),
(2) Date: Aug. 8, 2016

(87) PCT Pub. No.: WO2017/113757
PCT Pub. Date: Jul. 6, 2017

(65) Prior Publication Data
US 2018/0004391 A1    Jan. 4, 2018

(30) Foreign Application Priority Data

Dec. 31, 2015  (CN) .......................... 2015 1 1026691
Dec. 31, 2015  (CN) .......................... 2015 1 1029344
Dec. 31, 2015  (CN) .......................... 2015 1 1029860

(51) Int. Cl.
*G06F 3/0481* (2013.01)
*G06F 3/0484* (2013.01)
(Continued)

(52) U.S. Cl.
CPC .......... *G06F 3/04815* (2013.01); *G06F 3/011* (2013.01); *G06F 3/013* (2013.01);
(Continued)

(58) Field of Classification Search
CPC ............. G06F 3/04815; G06F 3/04847; G06F 3/0482; G06F 3/013; G02B 27/017
See application file for complete search history.

(56) References Cited

U.S. PATENT DOCUMENTS 5,433,608 A * 7/1995 Murray .................... G09B 9/14
434/29
5,446,834 A * 8/1995 Deering ............. G02B 27/0093
345/427

(Continued)

FOREIGN PATENT DOCUMENTS

CN           1959634 A      5/2007
CN         101924892 A     12/2010
(Continued)

*Primary Examiner* — Shourjo Dasgupta
(74) *Attorney, Agent, or Firm* — Harness, Dickey & Pierce, P.L.C.

(57) ABSTRACT

The present disclosure discloses a wraparound interface layout method, which adopts a user-centered wraparound layout in a stereo space, thus more display objects are available for the layout, and the expansibility is better; by clearly presenting the display objects located in a user's sight line to the user, main content in the interface is effectively highlighted, so that the user finds the sense of presence, and a better user experience is achieved; in addition, the distances from the display objects to the human eyes are corrected, which avoids the undesirable display effect that the objects close to the user are visually larger and the objects far away from the user are visually smaller, and provides a more comfortable viewing experience. The present disclosure discloses a content switching method and a list switching method under a three-dimensional immersive (Continued)

environment, which sufficiently utilizes spatial characteristics under the three-dimensional immersive environment, a content to be presented is divided into a plurality of content units, and only display the current content unit or the current list within the scope of the user's sight line, thereby effectively highlighting the content to be displayed, visually improving the sense of space, and enhancing the user's three-dimensional immersive experience. Moreover, the user's switching operation is simplified, thus through a very simple action within a narrow range, the user can complete the content switching or the list switching, and enjoy a smooth and accurate switching experience.

11 Claims, 5 Drawing Sheets

(51) Int. Cl.
G06F 3/0482 (2013.01)
G06F 3/01 (2006.01)
G02B 27/01 (2006.01)

(52) U.S. Cl.
CPC ........ *G06F 3/0482* (2013.01); *G06F 3/0484* (2013.01); *G06F 3/04847* (2013.01); *G02B 27/017* (2013.01); *G02B 2027/0134* (2013.01)

(56) References Cited

U.S. PATENT DOCUMENTS

| | | | | |
|---|---|---|---|---|
| 6,198,484 B1* | 3/2001 | Kameyama | ............ | G06T 15/10 345/419 |
| 6,351,273 B1* | 2/2002 | Lemelson | ............... | G06F 3/013 704/271 |
| 7,379,047 B2* | 5/2008 | Drucker | ................. | G06F 3/017 345/156 |
| 9,282,947 B2* | 3/2016 | Razzaque | ............. | A61B 8/0833 |
| 9,396,588 B1* | 7/2016 | Li | ............................ | G06F 3/011 |
| 2002/0105482 A1* | 8/2002 | Lemelson | ............... | G06F 3/013 345/7 |
| 2005/0243054 A1* | 11/2005 | Beymer | ............... | A61B 3/0033 345/156 |
| 2007/0120846 A1 | 5/2007 | Ok et al. | | |
| 2007/0233692 A1* | 10/2007 | Lisa | ................. | G06F 17/30651 |
| 2011/0107272 A1 | 5/2011 | Aguilar | | |
| 2011/0175932 A1* | 7/2011 | Yu | ........................... | G06F 3/013 345/661 |
| 2011/0179368 A1 | 7/2011 | King et al. | | |
| 2012/0017147 A1 | 1/2012 | Mark | | |
| 2012/0154920 A1* | 6/2012 | Harrison | ............. | G02B 3/0056 359/619 |
| 2013/0125043 A1 | 5/2013 | Jeon et al. | | |
| 2013/0293488 A1* | 11/2013 | Na | ......................... | G06F 3/013 345/173 |
| 2014/0055348 A1 | 2/2014 | Sudo | | |
| 2014/0282196 A1* | 9/2014 | Zhao | ....................... | G06F 3/013 715/771 |
| 2014/0337773 A1 | 11/2014 | Phang et al. | | |
| 2014/0359521 A1* | 12/2014 | Lin | ........................ | G06F 3/013 715/781 |
| 2015/0007114 A1* | 1/2015 | Poulos | ................... | G06F 3/012 715/852 |
| 2015/0049013 A1* | 2/2015 | Rahman | .................. | G06F 3/013 345/156 |
| 2015/0049112 A1* | 2/2015 | Liu | ........................ | G06T 19/006 345/633 |
| 2015/0049113 A1* | 2/2015 | Rahman | ............ | G06F 17/30277 345/633 |
| 2015/0049201 A1* | 2/2015 | Liu | ........................ | H04N 17/00 348/189 |
| 2015/0055808 A1* | 2/2015 | Vennstrom | .............. | G06F 3/167 381/307 |
| 2015/0058812 A1* | 2/2015 | Lindh | ..................... | G06F 3/013 715/863 |
| 2015/0143293 A1* | 5/2015 | George-Svahn | ...... | G06F 3/0482 715/815 |
| 2015/0187224 A1* | 7/2015 | Moncrief | ............... | G09B 9/052 434/30 |
| 2015/0332091 A1* | 11/2015 | Kim | ........................ | G06K 9/46 382/103 |
| 2015/0338915 A1* | 11/2015 | Publicover | .............. | G06F 21/64 345/633 |
| 2015/0363070 A1 | 12/2015 | Katz | | |
| 2016/0026342 A1* | 1/2016 | Cohen | .................. | G06F 3/0482 715/821 |
| 2016/0063762 A1* | 3/2016 | Heuvel | ................... | G06F 3/011 345/633 |
| 2016/0163108 A1* | 6/2016 | Kim | .................. | G02B 27/0101 345/633 |
| 2016/0259405 A1* | 9/2016 | Wilson | .................... | G06F 3/012 |
| 2016/0291691 A1* | 10/2016 | Lee | ........................ | G09G 3/003 |
| 2017/0102845 A1* | 4/2017 | Ozuysal | ............. | G06F 3/04817 |
| 2017/0123491 A1* | 5/2017 | Hansen | .................. | G06F 3/013 |
| 2017/0123500 A1* | 5/2017 | Needham | ............... | G06F 3/017 |
| 2018/0004391 A1 | 1/2018 | Rao et al. | | |

FOREIGN PATENT DOCUMENTS

| | | |
|---|---|---|
| CN | 101986254 A | 3/2011 |
| CN | 102084354 A | 6/2011 |
| CN | 102819397 A | 12/2012 |
| CN | 102902485 A | 1/2013 |
| CN | 102981743 A | 3/2013 |
| CN | 102985896 A | 3/2013 |
| CN | 103019519 A | 4/2013 |
| CN | 103106012 A | 5/2013 |
| CN | 103207664 A | 7/2013 |
| CN | 103412700 A | 11/2013 |
| CN | 103477313 A | 12/2013 |
| CN | 103631364 A | 3/2014 |
| CN | 103793060 A | 5/2014 |
| CN | 103858074 A | 6/2014 |
| CN | 104166497 A | 11/2014 |
| CN | 104244019 A | 12/2014 |
| CN | 104536650 A | 4/2015 |
| CN | 204679953 U | 9/2015 |
| CN | 105183288 A | 12/2015 |
| CN | 105191327 A | 12/2015 |
| CN | 105208368 A | 12/2015 |
| CN | 105653034 A | 6/2016 |
| CN | 105677165 A | 6/2016 |
| CN | 105677275 A | 6/2016 |
| EP | 2330808 A2 | 6/2011 |
| WO | WO-2010035536 A1 | 4/2010 |
| WO | WO-2015163529 A1 | 10/2015 |

* cited by examiner

WRAPAROUND INTERFACE LAYOUT METHOD, CONTENT SWITCHING METHOD UNDER THREE-DIMENSIONAL IMMERSIVE ENVIRONMENT, AND LIST SWITCHING METHOD

TECHNICAL FIELD

The present disclosure relates to the technical field of interface layout design, and particularly, to a wraparound interface layout method, a content switching method under a three-dimensional immersive environment, and a list switching method.

BACKGROUND

At present, the display interfaces of various computers, mobile terminals and virtual reality devices are all in the plane tiled layout. The number of the layout objects is limited, the content can only be switched by swiping the screen, and the interface functional expansibility is not strong. Meanwhile, such an interface layout cannot bring the sense of presence to a user. When a plurality of objects are lay out on a rather large display device, the objects close to the user are visually larger, and the objects far away from the user are visually smaller, thus the viewing effect is poor. Obviously, the user interaction experience of such a plane tiled layout is also bad.

For example, regarding applications under the three-dimensional immersive environment, currently whether the interaction mode of content switching or the interaction mode of list switching substantially remains the two-dimensional gesture operating and visual switching modes. For example, when the user operates with a left-to-right or right-to-left gesture, the interface tiling is to appear or disappear from left to right or from right to left. But during the immersive experience, with this operation mode, the user has too large a hand operation magnitude in the three dimensional scene, and needs to distinguish whether the direction of the physical touch-screen operation is correct and accurate. Thus the user's visual experience effect of the three-dimensional immersion is poor, and the user still has a visual experience of viewing a flat panel television or other two-dimensional application, which seriously affects the user's intuitive visual sensation, and decreases the user viscosity of the three-dimensional immersive product in a certain degree.

SUMMARY OF THE DISCLOSURE

In view of the above situation, the embodiments of the present disclosure provide a wraparound interface layout method, and a content switching method and a list switching method under a three-dimensional immersive environment, which can enable a user to find the sense of presence, visually enhance the sense of space, and improve the user viscosity.

According to an aspect of the present disclosure, the present disclosure provides a wraparound interface layout method, comprising:

dividing an entire interface into a plurality of display objects, and laying out the plurality of display objects wraparoundly in a stereo space;

acquiring a user's sight line, and clearly presenting the display objects located within the scope of the user's sight line to the user according to a direction of the user's sight line.

Wherein, the method further comprises:

setting a three-dimensional spatial coordinate range for each display object;

laying out each display object in the stereo space according to the three-dimensional spatial coordinate range;

if the three-dimensional spatial coordinate of a point on a display object is within the scope of the user's sight line, judging that the display object is located within the scope of the user's sight line.

Wherein, each display object is a curved surface object capable of clinging to a surface of the stereo space; or each display object is a planar object perpendicular to the user's sight line.

Wherein, the stereo space is a cylinder space which takes the user as a center, and the plurality of display objects are in a 360° wraparound layout on a side of the cylinder space.

Wherein, the stereo space is a spherical space which takes the user as a center, the plurality of display objects are in a horizontal 360° and vertical 360° full-range wraparound layout on a surface of the spherical space, and distances from all the display objects to a human eye are equal to each other.

The wraparound interface layout method provided by the embodiment of the present disclosure has the following beneficial effects: by using the user-centered wraparound layout in the stereo space, more display objects are available for the layout, and the expansibility is better. By clearly presenting the display objects located within the scope of the user's sight line to the user, the main content in the interface is effectively highlighted, so that the user finds the sense of presence, and a better user experience is achieved. In a preferred embodiment, the distances from the display objects to the human eyes are corrected, and each display object is at a prime position within the scope of the user's sight line, which avoids the undesirable effect that the objects close to the user are visually larger and the objects far away from the user are visually smaller, and provides a more comfortable viewing experience.

According to another aspect of the present disclosure, the present disclosure provides a content switching method under a three-dimensional immersive environment, comprising:

dividing a content to be presented into a plurality of content units arranged in a certain order; and only displaying a current content unit, rather than other content units, within the scope of a user's sight line;

after receiving a content switching instruction sent from the user, quickly presenting the dynamic effect of switching content unit within the scope of the user's sight line;

according to the content switching instruction, switching the current content unit to be its adjacent content unit to be displayed within the scope of the user's sight line.

Wherein only displaying a current content unit within the scope of a user's sight line comprises: upon the user's demand, dividing the current content unit into a plurality of grids horizontally and vertically, each grid storing a content object; all the content objects in the current content unit are arranged in a manner of being around side surface of a cylinder, and each content object is displayed as a curved surface clinging to side surface of the cylinder.

Wherein after receiving a content switching instruction sent from the user, quickly presenting the dynamic effect of switching content unit within the scope of the user's sight line comprises: after receiving a content switching instruction sent from the user, quickly turning a part of content object of a content unit adjacent to the current content unit around the side surface of the cylinder into the scope of the user's sight line to be displayed together with a part of content object of the current content unit.

Wherein the content switching instruction is a gesture operation, including sliding a manipulation area from right to left, from left to right, from top to bottom or from bottom to top; or, the content switching instruction is an operation on a handle key, including operating a left arrow key, a right arrow key, a down arrow key or an up arrow key.

The content switching method under a three-dimensional immersive environment provided by the embodiment of the present disclosure has the following beneficial effects: by sufficiently utilizing spatial characteristics under the three-dimensional immersive environment, a content to be presented is divided into a plurality of content units, and only the current content unit, rather than other content units, is displayed within the scope of the user's sight line, which effectively highlights the main content, visually improves the sense of space, and enhances the user's three-dimensional immersive experience. The user's switching operation is simplified, and the problem that the operation is ambiguous when the user employs a virtual reality headset device is overcome. Through a very simple action of a small magnitude, the user can complete the content switching, and enjoy a smooth and accurate content switching experience. In addition, after the content switching instruction sent from the user is received, the dynamic effect of switching content unit is quickly presented within the scope of the user's sight line, which further enhances the user's spatial awareness and spatial impression. In a preferred embodiment, the current content unit is divided into a plurality of grids horizontally and vertically, each grid storing a content object. The content objects are arranged in a manner of around side surface of a cylinder, and each is displayed as a curved surface clinging to side surface of the cylinder, thereby further sufficiently utilizing the three-dimensional spatial characteristics to enhance the space stereo visual effect.

According to still another aspect of the present disclosure, the present disclosure provides a list switching method under a three-dimensional immersive environment, comprising:

displaying a certain number of lists in a manner of around side surface of a cylinder within the scope of a user's sight line, and displaying a current list at the forefront of the user's sight line while displaying other lists behind the current list;

after receiving a sheet switching instruction sent from the user, quickly presenting the dynamic effect of switching a sheet within the scope of the user's sight line;

according to the list switching instruction, switching the current list to an adjacent list to be displayed at the forefront, and displaying other lists behind the current list after switching.

Wherein displaying a current list at the forefront of the user's sight line while displaying other lists behind the current list comprises: displaying each list in a different row, wherein the current list is placed in a middle row, and the list in each row is displayed as a plane or curved surface clinging to side surface of the cylinder.

Wherein after receiving a content switching instruction sent from the user, quickly presenting the dynamic effect of switching a sheet within the scope of the user's sight line comprises: after receiving a content switching instruction sent from the user, quickly turning a list adjacent to the current list around side surface of the cylinder to the forefront of the user's sight line to be displayed together with the current list.

Wherein, the list switching instruction is a gesture operation, including sliding a manipulation area from top to bottom or from bottom to top; or, the list switching instruction is an operation on a handle key, including operating a down arrow key or an up arrow key.

Wherein, the method further comprises only loading an application program of the current list at a system background.

The list switching method under the three-dimensional immersive environment provided by the present disclosure has the following beneficial effects: by sufficiently utilizing spatial characteristics under the three-dimensional immersive environment, a certain number of lists are displayed in a manner of around side surface of a cylinder within the scope of the user's sight line, and the current list is displayed at the forefront of the user's sight line while other lists are displayed behind the current list, thereby effectively highlights the main content, visually improves the sense of space, and enhances the user's three-dimensional immersive experience. The user's operation is simplified, and the problem that the operation is ambiguous when the user employs a virtual reality headset device is overcome. Through a very simple action of a small magnitude, the user can complete the list switching, and enjoy a smooth and accurate list switching experience. In addition, after the list switching instruction sent from the user is received, the user's spatial awareness and spatial impression are further enhanced by quickly presenting the dynamic effect of switching a sheet within the scope of the user's sight line. In a preferred embodiment, the system background only loads the application program data of the current list, rather than the application program of other list, thereby effectively reducing the resource utilization efficiency and the load of equipment.

BRIEF DESCRIPTION OF THE DRAWINGS

In order to describe the technical solutions of the embodiments of the present disclosure or the prior art more clearly, the drawings to be used in the descriptions of the embodiments or the prior art will be briefly introduced as follows. It is obvious that the following drawings just illustrate some embodiments of the present disclosure, and a person skilled in the art can obtain other drawings from them without making any creative effort.

FIG. 7 (*a*) is a schematic diagram of the dynamic effect of left and right switching of a content unit in a content switching method under a three-dimensional immersive environment provided by an embodiment of the present disclosure;

FIG. 7 (*b*) is a schematic diagram of a dynamic effect of up and down switching of a content unit in a content switching method under a three-dimensional immersive environment provided by an embodiment of the present disclosure;

DETAILED DESCRIPTION

In order that the objects, technical solutions and advantages of the present disclosure are clearer, the embodiments of the present disclosure will be further described in details as follows with reference to the drawings.

To be noted, those described are just a part of embodiments, rather than all embodiments, of the present disclosure. Any other embodiment obtained by a person skilled in the art based on those embodiments of the present disclosure without making any creative effort shall fall within the protection scope of the present disclosure.

Figure 1:
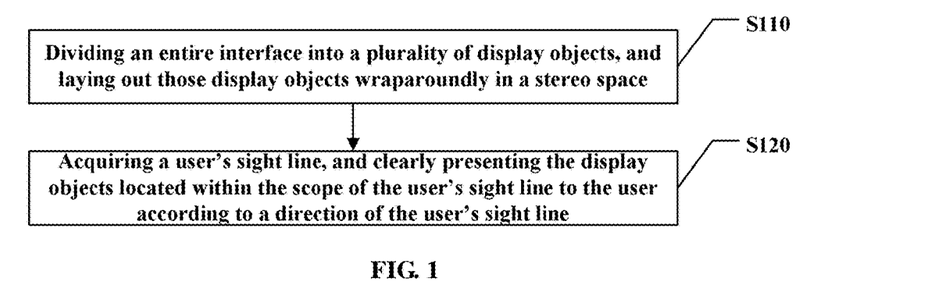
FIG. 1 is a flowchart of a wraparound interface layout method provided by an embodiment of the present disclosure.

FIG. 1 is a flowchart of a wraparound interface layout method provided by an embodiment of the present disclosure. As illustrated in FIG. 1, the wraparound interface layout method provided by the present disclosure comprises:

Step S110: dividing an entire interface into a plurality of display objects, and laying out those display objects wraparoundly in a stereo space.

Step S120: acquiring a user's sight line, and clearly presenting the display objects located within the scope of the user's sight line to the user according to a direction of the user's sight line.

In this embodiment, a layout is made in the stereo space, wherein the display objects are arranged around the user to be divergent from the user. When the user's body or head is turned, the direction of the sight line is changed, and the display objects located within the scope of the user's sight line are clearly presented to the user according to the direction of the user's sight line. The display objects located within the scope of the user's sight line may be magnified, or other display objects in the user's visual field may be fuzzy-processed, so that the display objects located within the scope of the user's sight line are clearly presented to the user, which effectively highlights the main content in the interface. By making the layout in the stereo space, more display objects are available for the layout, and the extendibility is better. The wraparound layout taking the user as the center enables the user to find the sense of presence and achieves a better user experience.

Figure 2:
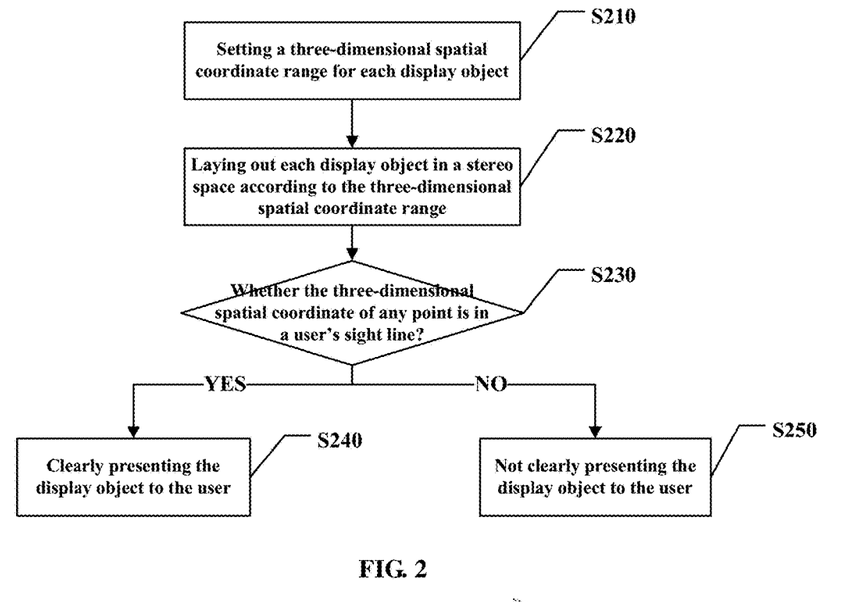
FIG. 2 is a flowchart of a wraparound interface layout method provided by a preferred embodiment of the present disclosure.

FIG. 2 is flowchart of a wraparound interface layout method provided by a preferred embodiment of the present disclosure. As illustrated in FIG. 2, based on the steps of FIG. 1, the preferred embodiment further comprises:

Step S210: establishing a coordinate system in the stereo space where the interface layout is made, and setting a three-dimensional spatial coordinate range for each display object. Each point on a display object is corresponding to a three-dimensional spatial coordinate in the stereo space, and a set of the three-dimensional spatial coordinates of all the points is the three-dimensional spatial coordinate range of the display object.

Step S220: laying out each display object in the stereo space according to the three-dimensional spatial coordinate range of the display object, so that the position of each point on the display object is corresponding to its three-dimensional spatial coordinate.

Step S230: judging whether the three-dimensional spatial coordinate of any point on a display object is within the scope of the user's sight line. If the three-dimensional spatial coordinate of a point on a display object is within the scope of the user's sight line, performing step S240, otherwise performing step S250.

Step S240: clearly presenting the display object to the user.

Step S250: not clearly presenting the display object to the user.

In this preferred embodiment, each display object has its three-dimensional spatial coordinate range. By calculating the user's sight line at present, it is judged whether the three-dimensional spatial coordinate of a certain point on the display object is within the scope of the user's sight line. If so, it can be deemed that the display object is located within the scope of the user's sight line, and then the display object is clearly presented to the user.

Figure 3:
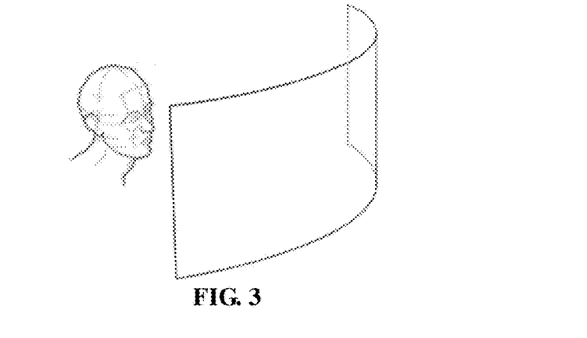
FIG. 3 is a schematic diagram of the stereo effect of a 360° wraparound layout provided by an embodiment of the present disclosure.

A preferred embodiment of the present disclosure is illustrated in FIG. 3, which is a schematic diagram of the stereo effect of a 360° wraparound layout provided by an embodiment of the present disclosure. An interface layout is made in a cylindrical space which takes the user as a center, wherein each display object is arranged at a position on the side of the cylindrical space, and all the display objects are in a user-centered 360° wraparound layout. When the user's sight line is turned leftwards or rightwards, corresponding display object located on the side of the cylindrical space can be seen. The distances from the display objects to the user's eyes are substantially the same, which avoids the effect of the plane tiled layout that the objects close to the user are visually larger and the objects far away from the user are visually smaller. By adjusting the distances from the display objects to the user, each display object can be at a prime position within the scope of the user's sight line, and the viewing effect is better.

Figure 4:
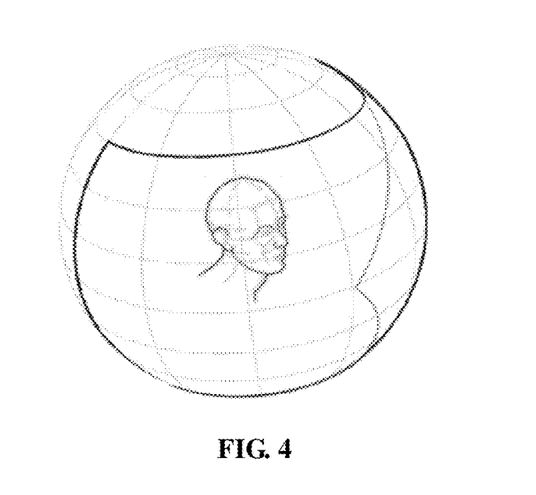
FIG. 4 is a schematic diagram of the stereo effect of a full-range wraparound layout provided by an embodiment of the present disclosure.

Another preferred embodiment of the present disclosure is illustrated in FIG. 4, which is a schematic diagram of the stereo effect of a full-range wraparound layout provided by an embodiment of the present disclosure. An interface layout is made in a spherical space which takes the user as a center, wherein each display object is arranged at a position on the surface of the spherical space, and all the display objects are in a user-centered horizontal 360° and vertical 360° full-range wraparound layout. In this preferred embodiment, since the user is located at the center of the spherical space, any point on the surface of the spherical space has the same distance to the user, which also avoids the effect of the plane tiled layout that the objects close to the user are visually larger and the objects far away from the user are visually smaller. By adjusting the distance to an appropriate value, the user can experience a more comfortable viewing effect.

Each display object arranged in the stereo space may be a plane object or a curved surface object. When the display objects are curved surface objects, they may be designed as curved surface objects clinging to the surface of the layout space, such as the cylindrical space and the spherical space. The layout objects may be arranged dispersedly, or spliced together to cover the surface of the entire layout space as a whole. When the display objects are plane objects, they may be designed as being perpendicular to the user's sight line, so that the user's view angle is better. Similarly, the plane objects may also be arranged dispersedly or spliced together to surround the surface of the layout space as a whole. When the user turns the body or head to change his sight line, the display objects located within the scope of the user's sight line are clearly presented to the user according to the direction of the user's sight line.

The wraparound interface layout method provided by the present disclosure can be widely applied to various computers, mobile terminals and virtual reality devices. For example, when it is applied to a virtual reality device, the virtual reality device can monitor the turning of a user's head. When the user's head is turned, the direction of the user's sight line is changed, then the virtual reality device judges the direction of the user's sight line through a gravity sensor, a gyroscope, etc., and clearly presents the display objects located within the scope of the user's sight line to the user. The operation is simple and convenient, and the sense of immersion is strong.

As compared with the prior art, a wraparound interface layout method provided by the present disclosure has the following beneficial effects:

1. By using the user-centered wraparound layout in the stereo space, more display objects are available for the layout, and the expansibility is better. By clearly presenting the display objects located within the scope of the user's sight line to the user, the main content in the interface is effectively highlighted, so that the user finds the sense of presence, and a better user experience is achieved.

2. The distances from the display objects to the human eyes are corrected, and each display object is at a prime position within the scope of the user's sight line, which avoids the undesirable effect that the objects close to the user are visually larger and the objects far away from the user are visually smaller, and provides a more comfortable view experience.

Next, the applications under the three-dimensional immersive environment are taken as examples to describe the interaction mode of content switching and the interaction mode of list switching in the wraparound interface layout in details, respectively.

Figure 5:
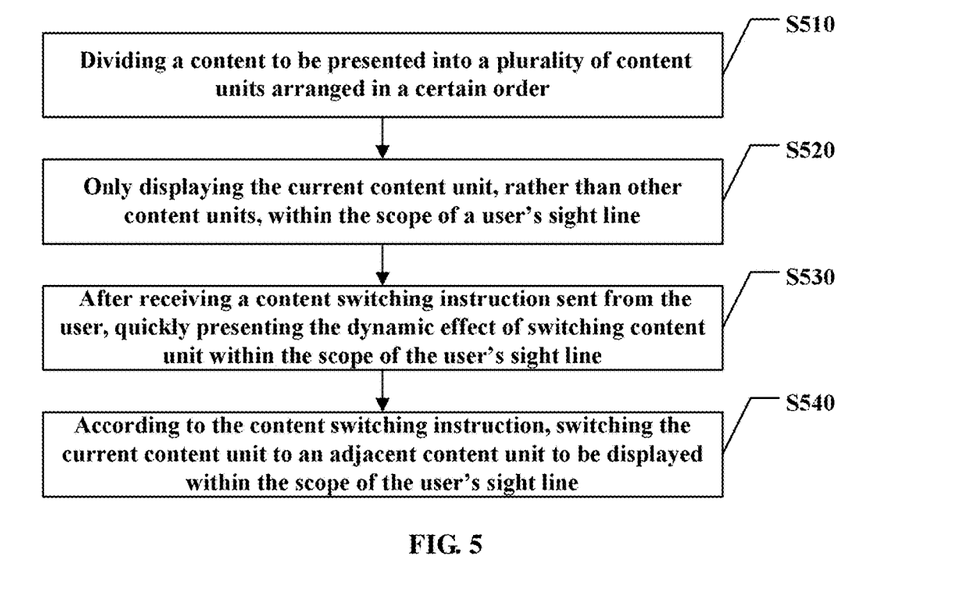
FIG. 5 is a flowchart of a content switching method under a three-dimensional immersive environment provided by an embodiment of the present disclosure.

FIG. 5 is a flowchart of a content switching method under a three-dimensional immersive environment provided by an embodiment of the present disclosure. As illustrated in FIG. 5, the content switching method under the three-dimensional immersive environment provided by the present disclosure comprises:

Step S510: dividing a content to be presented into a plurality of content units arranged in a certain order. Each content unit includes a part of the content to be presented.

Step S520: only displaying the current content unit, rather than other content units, within the scope of the user's sight line. Only the content of one content unit is displayed within the scope of the user's sight line as the current content unit. When the user wants to view other content, a switching may be made between the content units.

Step S530: after receiving a content switching instruction sent from the user, quickly presenting the dynamic effect of switching content unit within the scope of the user's sight line. Specifically, quickly turning a part of content object of a content unit adjacent to the current content unit around side surface of a cylinder into the scope of the user's sight line to be displayed together with a part of content object of the current content unit, so as to enhance the user's spatial awareness and spatial impression.

Step S540: according to the content switching instruction, switching the current content unit to an adjacent content unit to be displayed within the scope of the user's sight line. When the user wants to view other content, a content unit arranged adjacently to the current content unit is switched into the scope of the user's sight line as a new content unit according to the content switching instruction sent from the user, and the original content unit is no longer displayed.

Figure 6:
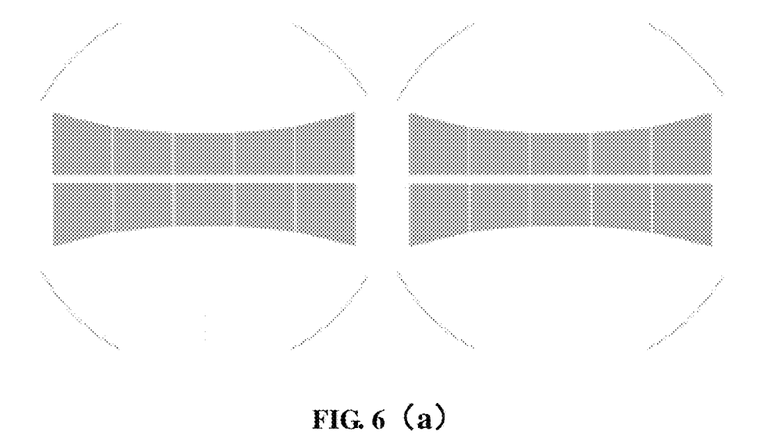
FIG. 6 is a schematic diagram of the arrangement modes of the content objects in a content switching method under a three-dimensional immersive environment provided by an embodiment of the present disclosure, wherein FIG. 6 (*a*) is an arrangement mode of two rows and five columns, FIG. 6 (*b*) is an arrangement mode of three rows and five columns, and FIG. 6 (*c*) is an arrangement mode of four rows and five columns.

FIG. 6 is a schematic diagram of the arrangement modes of the content objects in a content switching method under a three-dimensional immersive environment provided by an embodiment of the present disclosure, wherein FIG. 6 (a) is an arrangement mode of two rows and five columns, FIG. 6 (b) is an arrangement mode of three rows and five columns, and FIG. 6 (c) is an arrangement mode of four rows and five columns. As illustrated in FIGS. 6 (a), 6 (b) and 6 (c), in the preferred embodiment of the present disclosure, upon the user's demand, the current content unit may be divided into a plurality of grids horizontally and vertically, each grid storing a content object. For example, an arrangement may be made in the form of two rows and five columns, three rows and five columns, or four rows and five columns. All the content objects in the current content unit are arranged in a manner of around side surface of a cylinder, and the cylinder is erected at the forefront of the user's sight line. Each content object is displayed as a curved surface clinging to side surface of the cylinder, which sufficiently utilizes the spatial characteristics of the three-dimensional scene to enhance the user's spatial awareness and spatial impression.

Figure 7:
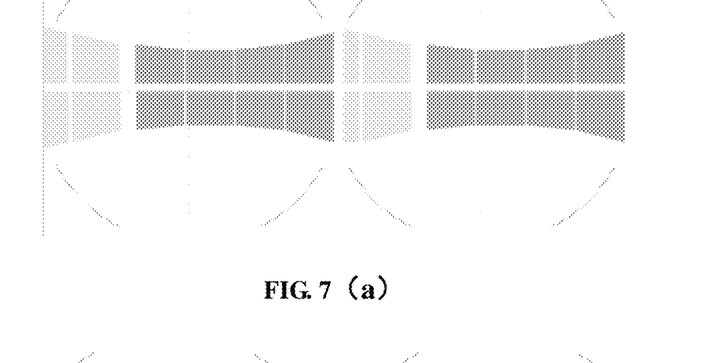

FIG. 7 (a) is a schematic diagram of the dynamic effect of left and right switching of a content unit in a content switching method under a three-dimensional immersive environment provided by an embodiment of the present disclosure; and FIG. 7 (b) is a schematic diagram of a dynamic effect of up and down switching of a content unit in a content switching method under a three-dimensional immersive environment provided by an embodiment of the present disclosure. As illustrated in FIGS. 7 (a) and 7 (b), when a content switching instruction sent from the user is received, a part of content object of a content unit adjacent to the current content unit is quickly turned around side surface of a cylinder into a scope of the user's sight line to be displayed together with a part of content object of the current content unit. The switching may be made between left and right content units, as illustrated in FIG. 7 (a), and also be made between upper and lower content units, as illustrated in FIG. 7 (b).

In a preferred embodiment, the user may send a content switching instruction through a gesture operation, including sliding a manipulation area from right to left, from left to right, from top to bottom or from bottom to top. Alternatively, the user may also send a content switching instruction by operating a handle key, including operating a left arrow key, a right arrow key, a down arrow key or an up arrow key. The switching effect and corresponding gesture may be set randomly upon demand. If a left-right switching is set, a previous content unit adjacent to the current content unit is switched into the scope of the user's sight line as a new current content unit, when the user slides the manipulation area from left to right or from top to bottom, and a next content unit adjacent to the current content unit is switched into the scope of the user's sight line as a new current content unit, when the user slides the manipulation area from right to left or from bottom to top. Thus the user can enjoy a smooth and accurate content switching experience through a very simple action of a small magnitude.

As compared with the prior art, a content switching method under a three-dimensional immersive environment provided by the present disclosure has the following beneficial effects:

1. By sufficiently utilizing spatial characteristics under the three-dimensional immersive environment, a content to be presented is divided into a plurality of content units, and only the current content unit, rather than other content units, is displayed within the scope of the user's sight line, which effectively highlights the main content, visually improves the sense of space, and enhances the user's three-dimensional immersive experience.

2. The user's operation is simplified, and the problem that the operation is ambiguous when the user employs a virtual reality headset device is overcome. Through a very simple action of a small magnitude, the user can complete the content unit switching, and enjoy a smooth and accurate content switching experience. In addition, after the content switching instruction sent from the user is received, the dynamic effect of switching the content unit is quickly presented within the scope of the user's sight line, which further enhances the user's spatial awareness and spatial impression.

3. The current content unit is divided into a plurality of grids horizontally and vertically, each grid storing a content object. The content objects are arranged in a manner of around side surface of a cylinder side, and each is displayed as a curved surface clinging to side surface of the cylinder, thereby further sufficiently utilizing the three-dimensional spatial characteristics to enhance the space stereo visual effect.

Figure 8:
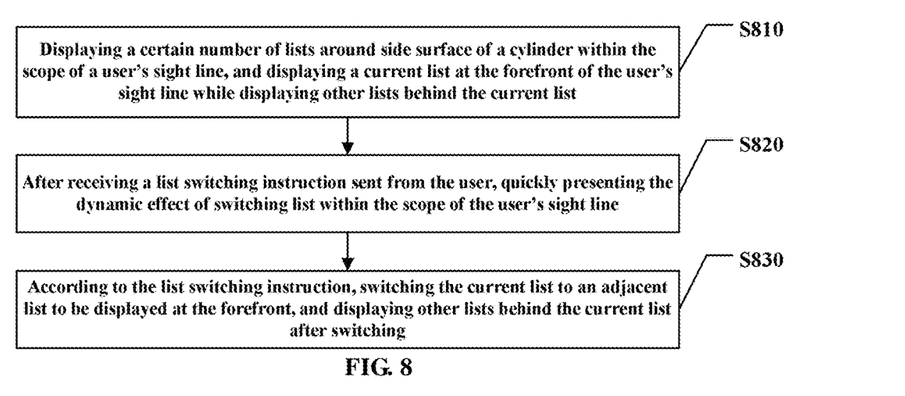
FIG. 8 is a flowchart of a list switching method under a three-dimensional immersive environment provided by an embodiment of the present disclosure.

FIG. 8 is a flowchart of a list switching method under a three-dimensional immersive environment provided by an embodiment of the present disclosure. As illustrated in FIG. 8, the list switching method under a three-dimensional immersive environment provided by the present disclosure comprises:

Step S810: displaying a certain number of lists in a manner of around side surface of a cylinder within the scope of the user's sight line, and displaying a current list at the forefront of the user's sight line while displaying other lists behind the current list. The main content is effectively highlighted by displaying the current list at the forefront of the user's sight line while displaying other lists behind the current list. Firstly, the current list is displayed within the scope of the user's sight line. The current list may be a default list when the user initially enters a certain application, or a certain list selected by the user. As to the visual effect, the current list is placed at the forefront of the user's sight line, and the user feels that the current list is the closest; the lists adjacent to the current list are placed slightly further within the scope of the user's sight line, and when the distance from a list to the current list increases, that list is visually further from the user.

Step S820: after receiving a list switching instruction sent from the user, quickly presenting the dynamic effect of switching a sheet within the scope of the user's sight line. Specifically, after receiving a list switching instruction sent from the user, quickly turning a list adjacent to the current list around side surface of a cylinder to the forefront of the user's sight line to be displayed together with the current list, so as to enhance the user's spatial awareness and spatial impression.

Step S830: according to the list switching instruction, switching the current list to an adjacent list to be displayed at the forefront, and displaying other lists behind the current list after switching. Specifically, each list is displayed at a different row, wherein the current list is placed in a middle row, and the list in each row is displayed as a plane or curved surface clinging to side surface of the cylinder. Therefore, by sufficiently utilizing spatial characteristics under the three-dimensional immersive environment, a certain number of lists are displayed in a manner of around side surface of the cylinder within the scope of the user's sight line, which visually improves the sense of space, and enhances the user's three-dimensional immersive experience.

After the user sends the list switching instruction in a certain form, the dynamic effect of replacing the current list with other list is presented within the scope of the user's sight line, the current list gradually goes away from the user, and a certain list selected by the user gradually approaches the user until it reaches the forefront of the user's sight line and becomes a new current list. The user can browse the content of the current list more comfortably, while the main content is effectively highlighted and the visual effect is more obvious, thus the user's operation can be guided more effectively.

Figure 9:
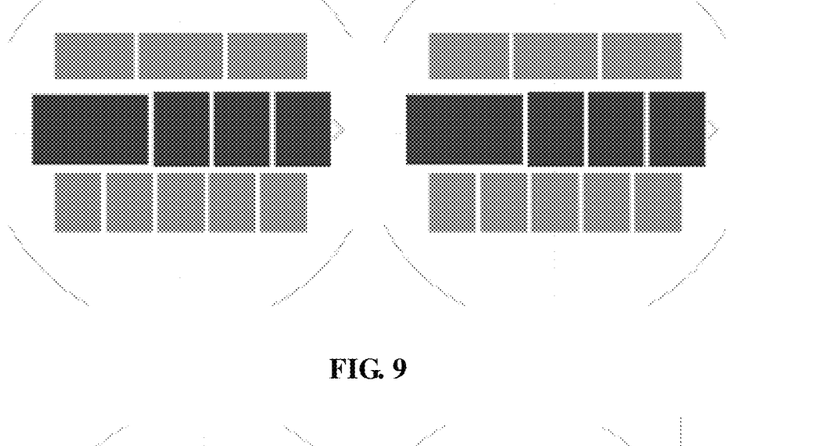
FIG. 9 is a schematic diagram of a list arrangement mode in a list switching method under a three-dimensional immersive environment provided by an embodiment of the present disclosure.
Figure 10:
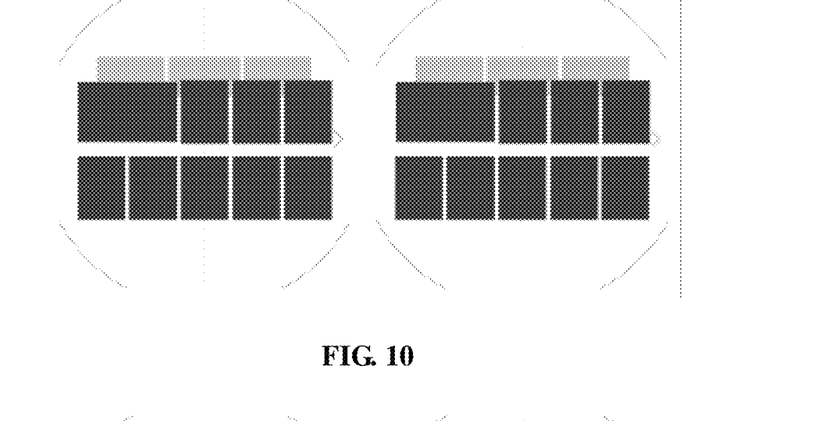
FIG. 10 is a schematic diagram of the dynamic effect of switching a list in a list switching method under a three-dimensional immersive environment provided by an embodiment of the present disclosure.
Figure 11:
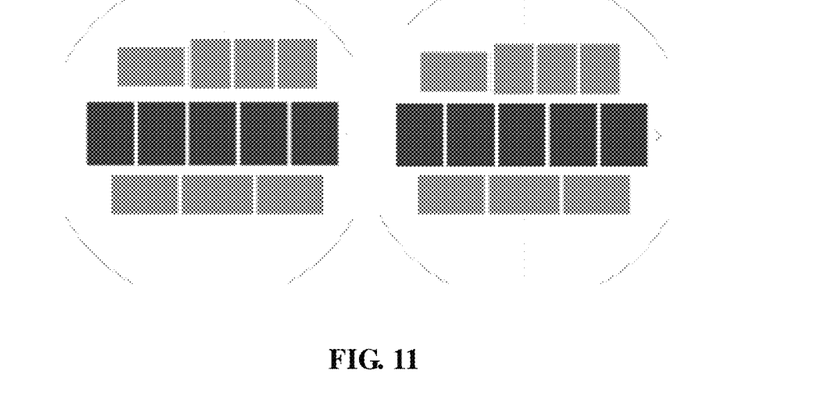
FIG. 11 is a schematic diagram of an arrangement order after switching a list in a list switching method under a three-dimensional immersive environment provided by an embodiment of the present disclosure.

FIG. 9 is a schematic diagram of a list arrangement mode in a list switching method under a three-dimensional immersive environment provided by an embodiment of the present disclosure. FIG. 10 is a schematic diagram of the dynamic effect of switching a list in a list switching method under a three-dimensional immersive environment provided by an embodiment of the present disclosure. FIG. 11 is a schematic diagram of an arrangement order after a list switching in a list switching method under a three-dimensional immersive environment provided by an embodiment of the present disclosure. As illustrated in FIGS. 9 to 11, as a preferred solution, in step S810, the current list and other lists can be arranged as follows: each list is displayed in a different row, wherein the current list is placed in a middle row, and the list in each row is arranged in a manner of around side surface of a cylinder side; the cylinder is transversely placed right ahead the user's sight line with its side facing the user; the current list is displayed at the forefront of the user's sight line, and the user feels that it is the closest, while other lists are placed slightly further. For example, only three rows of lists are illustrated in FIG. 9, wherein the current list is displayed in the middle row, and the two lists adjacent to the current list are placed below and above and slightly further than the current list, which visually highlights the current list and improves the sense of space. During switching, the dynamic effect of turning each list around side surface of the cylinder is presented to the user. For example, when the lists are switched from bottom to top, the dynamic effect is as illustrated in FIG. 10, an adjacent list below the current list is quickly turned around side surface of the cylinder to the forefront of the user's sight line to be displayed together with the current list, and then becomes a new current list to be displayed at the forefront of the user's sight line; the list originally in the middle row is turned around side surface of the cylinder to the above, the list originally in the first row gradually disappears within the scope of the user's sight line, and a list adjacent to the new current list is displayed in the third row, thus the three-dimensional effect is completely presented in vision. For example, if there are three rows of lists in total, the arrangement order after the list switching of FIG. 9 is as illustrated in FIG. 11. The sense of space is visually improved, and the user's three-dimensional immersive experience is enhanced. In addition, the number of lists simultaneously presented to the user is reduced so that the whole interface is cleaner, and the utilization of the display resources is also decreased. Although only a limited number of the lists are displayed, the total number of the lists can be extended infinitely and may be set upon demand.

Preferably, the list switching instruction in step S820 may be sent by the user through a gesture operation, including sliding the manipulation area from right to left or from left to right, or the gesture may be made in a space provided with a gesture identifying device. It also may be sliding a finger up and down on a surface supporting touch control, wherein the up and down directions may be not precisely up and down, upper left and upper right can also be deemed as the up direction. In addition, the user can send the list switching instruction by operating a handle key, such as a down arrow key or an up arrow key. Thus the user can enjoy a smooth and accurate list switching experience through a very simple action of a small magnitude.

Further, it may be set that the user sends a list switching instruction to complete a switching between the current list and the adjacent list. For example, when the user slides the manipulation area from bottom to up for one time, a list below the current list is switched to the forefront of the user's sight line, thus the operation is more flexible, and the user can accurately perform the switching operation to find the required list by orderly switching the lists one by one, without needing to accurately select the required list, thereby overcoming the problem that the operation is ambiguous when the user employs a virtual reality headset device, and the user's operation can be guided more effectively. Thus the user can accurately perform the switching operation without needing to make an accurate operation.

In another preferred embodiment of the present disclosure, the system background only loads the application program of the current list. Usually, the user needs to operate the content displayed in the list. For example, a list may be used as a program entry, and the user enters an application by clicking the list. In the conventional list displaying and switching method, all the displayed lists load application program data at the background, but the user will not use all the application program data. As a result, too much amount of data are loaded at the background, which wastes the cache resources and the network resources, and increases the load of equipment. In order to effectively reduce the resource utilization efficiency and the load of the equipment, in this preferred embodiment, the system background just loads the application program of the current list, and only provides a display function for other displayed lists, so that various data such as images and texts can be normally displayed, but the user cannot perform other operation on the non-current list.

The list switching method under the three-dimensional immersive environment provided by the present disclosure provides a more simple and convenient interaction experience, so that the user can obtain a better three-dimensional immersive experience, thereby optimizing and simplifying the user's limb operation, and improving the user's space impression in the three-dimensional immersive application.

As compared with the prior art, the list switching method under the three-dimensional immersive environment provided by the present disclosure has the following beneficial effects:

1. By sufficiently utilizing spatial characteristics under the three-dimensional immersive environment, a certain number of lists are displayed surrounding side surface of a cylinder within the scope of the user's sight line, and the current list is displayed at the forefront of the user's sight line while other lists are displayed behind the current list, thereby effectively highlights the main content, visually improves the sense of space, and enhances the user's three-dimensional immersive experience.

2. The user's operation is simplified, and the problem that the operation is ambiguous when the user employs a virtual reality headset device is overcome. Through a very simple action within a narrow range, the user can complete the list switching, and enjoy a smooth and accurate list switching experience. In addition, after the list switching instruction sent from the user is received, the user's spatial awareness and spatial impression are further enhanced by quickly presenting the dynamic effect of switching the list within the scope of the user's sight line.

3. The system background only loads the application program data of the current list, rather than the application program of any other list, thereby effectively reducing the resource utilization efficiency and the load of the equipment.

The above descriptions are just specific embodiments of the present disclosure, while the protection scope of the present disclosure is not limited thereto. Any change or replacement easily conceivable to a person skilled in the art within the technical scope revealed by the present disclosure shall be covered by the protection scope of the present disclosure. Therefore, the protection scope of the present disclosure shall be determined by those of the claims.

The invention claimed is:

1. A method of laying out a wraparound interface, the method, comprising:
   dividing an interface into a plurality of display objects;
   laying out the plurality of display objects in a 360 degree wraparound layout on a side of a cylindrical space centered around a user;
   acquiring a sight line of the user;
   presenting the display objects located within a scope of the user's sight line to the user according to a direction of the user's sight line:
   setting a three-dimensional spatial coordinate range for each display object;
   laying out each display object in the cylindrical space according to the three-dimensional spatial coordinate range, where a three-dimensional spatial coordinate for each display object corresponds to a position of the display object on the side of the cylindrical space; and
   when the three-dimensional spatial coordinate of a point on one of the display objects is within the scope of the user's sight line, determining that said one of the display objects is located within the scope of the user's sight line.

2. The method according to claim 1, wherein:
   each display object comprises a curved surface object positioned on a surface of the cylindrical space; or
   each display object comprises a planar object positioned perpendicular to the user's sight line.

3. The method of claim 1, further comprising:
   dividing a content to be presented into a plurality of content units arranged in a specified order;
   displaying only a current one of the plurality of content units within the scope of the user's sight line, wherein the current content unit is divided into a plurality of grids horizontally and vertically, each grid stores a content object, and all of the content objects in the current content unit are arranged around a side surface of the cylindrical space;

after receiving a content switching instruction from the user, presenting a dynamic effect of switching content units within the scope of the user's sight line; and according to the content switching instruction, switching the current content unit to an adjacent content unit to be displayed within the scope of the user's sight line.

4. The method according to claim 3, wherein each content object in the current content unit is displayed as a curved surface on the side surface of the cylindrical space.

5. The method according to claim 4, wherein presenting the dynamic effect of switching content unit within the scope of the user's sight line comprises:

after receiving the content switching instruction from the user, turning a part of one of the content objects of the content unit adjacent to the current content unit around the side surface of the cylinder into the scope of the user's sight line to be displayed together with a part of one of the content objects of the current content unit.

6. The method according to claim 4, wherein the content switching instruction includes a gesture operation including sliding a manipulation area from right to left, from left to right, from top to bottom or from bottom to top; or the content switching instruction includes an operation on a handle key, the operation including operating a left arrow key, a right arrow key, a down arrow key or an up arrow key.

7. The method of claim 1, further comprising:

displaying a specified number of lists around a side surface of the cylindrical space within the scope of a user's sight line, and displaying a current list at a forefront of the user's sight line while displaying other ones of the number of lists behind the current list;

after receiving a content switching instruction from the user, presenting a dynamic effect of switching lists within the scope of the user's sight line; and according to the list switching instruction, switching the current list to an adjacent list to be displayed at the forefront, and displaying other lists behind the current list after switching.

8. The method according to claim 7, wherein displaying a current list at the forefront of the user's sight line while displaying other lists behind the current list comprises:

displaying each list in a different row, wherein the current list is placed in a middle row, and the list in each row is displayed as a plane or curved surface positioned on the side surface of the cylindrical space.

9. The method according to claim 8, wherein presenting the dynamic effect of switching lists within the scope of the user's sight line comprises:

after receiving a content switching instruction from the user, turning a list adjacent to the current list around the side surface of the cylinder to the forefront of the user's sight line to be displayed together with the current list.

10. The method according to claim 9, wherein:

the list switching instruction includes a gesture operation including sliding a manipulation area from top to bottom or from bottom to top; or the list switching instruction includes an operation on a handle key, the operation including operating a down arrow key or an up arrow key.

11. The method according to claim 7, further comprising loading only an application program of the current list at a system background.

* * * * *